J. W. IVORY.
FASTENING FOR ARTIFICIAL TOOTH CROWNS.
APPLICATION FILED MAR. 21, 1911.
1,021,528.
Patented Mar. 26, 1912.
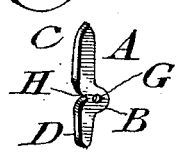
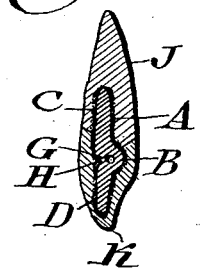
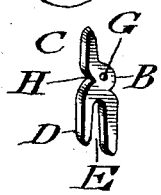
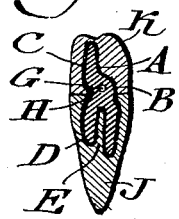
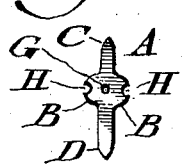
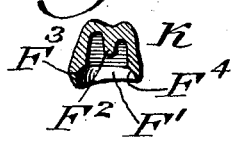
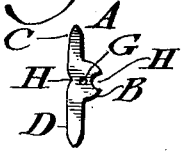
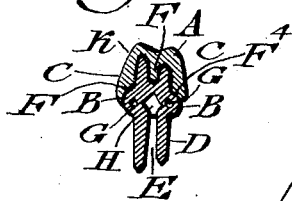
WITNESSES
P. F. Nagle
L. Rouville
BY James W. Ivory
Oberheim + Fairbank
ATTORNEYS
INVENTOR

UNITED STATES PATENT OFFICE.

JAMES W. IVORY, OF PHILADELPHIA, PENNSYLVANIA.

FASTENING FOR ARTIFICIAL-TOOTH CROWNS.

1,021,528.  Specification of Letters Patent.  Patented Mar. 26, 1912.

Application filed March 21, 1911. Serial No. 615,950.

*To all whom it may concern:*

Be it known that I, JAMES W. IVORY, a subject of the King of Great Britain, residing in the city and county of Philadelphia, State of Pennsylvania, have invented a new and useful Fastening for Artificial-Tooth Crowns, of which the following is a specification.

My invention has for its object means for conveniently and firmly securing an artificial tooth crown to a natural root and consists of a member adapted to be inserted in the root and crown and fixedly anchored therein against outward and lateral displacement, as will be hereinafter set forth.

It consists further in providing a member with means whereby it may be engaged by a suitable implement to effect its removal.

For the purpose of explaining my invention, the accompanying drawing illustrates a satisfactory reduction of the same to practice, but the important instrumentalities thereof may be varied, and so it is to be understood that the invention is not limited to the specific arrangement and organization shown and described.

Figure 1 represents a perspective view of a fastening embodying my invention. Fig. 2 represents a longitudinal section of the same in position, a root and crown being also shown in section. Fig. 3 represents a perspective view of another form of the fastening. Fig. 4 represents a longitudinal section of the form Fig. 3 in position, a root and crown being also shown in section. Figs. 5 and 6 represent side elevations of other forms of fastenings. Fig. 7 represents a longitudinal section of another form of the fastening including a section of a crown in which a portion of the fastening is fitted. Fig. 8 represents a sectional view of the crown as removed from Fig. 2. Fig. 9 represents a sectional view of the crown as removed from Fig. 4. Fig. 10 represents a sectional view of the crown as removed from Fig. 7.

Similar letters of reference indicate corresponding parts in the figures.

Referring to the drawings:—A designates a dowel pin formed of a flat piece of metal or other suitable material having intermediate of its ends the lateral offset B, the portions extending from said offset comprising the stems C, D. In Figs. 3 and 4, the stem is bifurcated as at E. In Fig. 5 there is an offset B, D on each side of the pin. In Fig. 7 each stem is bifurcated as at E, F. In each pin in a suitable portion thereof is an opening G which is duplicated in Fig. 7, the object of which will hereinafter be explained.

In Figs. 1, 2, 3, and 4 there is a recess H in the side of the pin opposite to the offset B. In Fig. 6 there is a recess H in the side of the offset B, and in Fig. 5 there is such recess in each offset, for a purpose to be hereinafter explained. In Fig. 7 there is a recess H at the base of the bifurcation E and consequently intermediate of the offset B.

It will be understood that the crowns are each provided with recesses to conform to the contour of the dowel pin, thus in Fig. 8, the crown K has therein the recess $D'$ which extends in the direction of the length of the crown and receives the relative portion of the dowel pin, the upper portion of said recess being extended in width as at $D^2$, one wall of the extended portion $D^2$ curving as at $D^3$ in accordance with the portion of the offset B of the dowel pin which it occupies in Fig. 2, and the opposite wall having an inwardly extending spur or projection $D^4$ thereon, so as to conform to the recess H, in the side of said dowel pin in said Fig. 2, the portion of said pin that occupies the crown when cemented therein, thus fully and properly filling the crown.

In Fig. 9, the crown K has therein the recess $C'$, the same extending in the direction of the crown, to receive the relative portion of the dowel pin, the lower portion of said recess being widened as at $C^2$, one wall thereof curving as at $C^3$ in accordance with the portion of the offset B of the dowel pin which it occupies in Fig. 4, and the opposite wall having an inwardly extending spur $C^4$ therein, so as to conform to the recess H in the side of said dowel pin in said Fig. 4, the portion of said pin that occupies the crown when cemented thereon, thus fully and properly filling the crown.

In Fig. 10, the crown K has therein the recess $F'$ and the projecting division $F^2$ between the same, the swells $F^3$ and $F^4$ in opposite walls of said recess to receive the offsets G, G of the anchor, the interior of said crown thus conforming to the contour of the portions of the anchor that occupy the same.

In operation, the stems are fitted respectively in the natural root J and crown K and secured therein by suitable material some of which enters the opening G and forms an anchor therein, the same joining the material that surrounds the stem that occupies the crown as means of fastening or securing the stem in the crown additional to the other fastening means, the pulp canal of the root having been prepared to receive its stem, the latter then being embedded therein. The crown is fitted in place on the root when it will be seen that as the pin is immovably anchored in the respective parts, the crown will be firmly connected as one with the root, the offset or offsets B and the recess or recesses H affording additional surfaces for holding the pin in position. When the material that occupies the opening G is picked-out or otherwise cleared therefrom, said opening provides means for the application of a suitable implement thereto for the removal of the pin.

It is to be noted that the oppositely disposed stems are in the same right line whereby the crown is not liable to be wrenched off laterally and the opening is disposed at substantially the midlength of the pin and at a point opposite the recess so as to be substantially in alinement with the anchor or anchors.

Having thus described my invention what I claim as new and desire to secure by Letters Patent, is:—

1. A fastening for an artificial tooth crown comprising a dowel pin having opposite end portions comprising reversely pointing stems disposed in the same right line and which are adapted to enter respectively such crown and a natural root, said pin being formed with an offset intermediate of said stems with a transversely disposed opening in said offset and with a recess opposite said offset.

2. A fastening device for an artificial tooth crown composed of a substantially flat dowel pin, the opposite end portions of which constitute reversely pointing stems disposed in the same right line, one of said stems being provided with a bifurcation and the pin having a recess intermediate the stems.

3. In a fastening for an artificial tooth crown, a dowel pin, the same having an opening transversely therein, said opening being disposed in a portion to be surrounded by the filling or fastening material to receive some of such fastening material, said pin being further provided with a recess adjacent said opening.

4. A fastening for an artificial tooth crown composed of a dowel pin, the opposite end portions of which comprise reversely pointed stems extending in substantially the same right line and formed with a lateral offset said pin having a recess upon its face.

5. A fastening for an artificial tooth crown comprising a dowel pin the opposite end portions of which comprise reversely pointed stems disposed in substantially the same right line, said pin being formed with a lateral offset near its midlength and an opening extending transversely through said pin.

JAMES W. IVORY.

Witnesses:
 JOHN A. WIEDERSHEIM,
 WM. CANER WIEDERSHEIM.